United States Patent [19]
Ando et al.

[11] Patent Number: 5,381,491
[45] Date of Patent: Jan. 10, 1995

[54] BIT POSITION ENCODER IMPROVED IN OPERATING SPEED

[75] Inventors: Kazumasha Ando, Kawasaki; Shigeharu Nakata, Yokohama; Nobutaka Kitagawa; Shingo Hanatani, both of Kawasaki, all of Japan

[73] Assignee: Kabushiki Kaisha Toshiba, Kawasaki, Japan

[21] Appl. No.: 968,404

[22] Filed: Oct. 29, 1992

[30] Foreign Application Priority Data

Oct. 30, 1991 [JP] Japan ................................. 3-284767

[51] Int. Cl.⁶ .............................................. G06K 9/36
[52] U.S. Cl. ....................................................... 382/56
[58] Field of Search .................. 382/56, 41, 74; 358/262.1, 42, 62; 341/50, 55, 56

[56] References Cited

U.S. PATENT DOCUMENTS

| | | | |
|---|---|---|---|
| 4,646,356 | 2/1987 | Anderson et al. | 382/56 |
| 4,724,483 | 2/1988 | Shinada | 382/56 |
| 4,783,834 | 11/1988 | Anderson et al. | 382/56 |
| 4,837,848 | 6/1989 | Henderson et al. | 382/56 |
| 4,932,066 | 6/1990 | Nakayama et al. | 382/56 |
| 5,033,105 | 7/1991 | Atkinson | 382/56 |

*Primary Examiner*—Joseph Mancuso
*Attorney, Agent, or Firm*—Finnegan, Henderson, Farabow, Garrett & Dunner

[57] ABSTRACT

A bit position encoder comprises a plurality of judging circuits corresponding in number to bits of input data and connected to receive respective bits of the input data in parallel and a signal specifying the processing sequence for making a judgment on the basis of the result of a judgment from an adjacent judging circuit that has made a judgment of whether a corresponding input bit input thereto has a predetermined value and supplying the result of the judgment to an adjacent judging circuit that has not performed judgment processing yet, a circuit responsive to the results of judgments from the judging circuits for pointing out the bit position in the predetermined value appears first in the direction of judgment processing sequence in a binary code, and a circuit connected to receive the input bits for supplying a result of the logical OR of the input bits to the judging circuits.

7 Claims, 4 Drawing Sheets

| 7 | 6 | 5 | 4 | 3 | 2 | 1 | 0 | |
|---|---|---|---|---|---|---|---|---|
| 0 | 0 | 1 | 0 | 0 | 1 | 0 | 0 | D 0~7 |
| 1 | 1 | 1 | 1 | 1 | A B | 0 | 0 | T 0~7 |
| 0 | 0 | C D | 1 | 1 | 1 | 1 | 1 | T 0~7 |

FIG. 2

| 7 | 6 | 5 | 4 | 3 | 2 | 1 | 0 | |
|---|---|---|---|---|---|---|---|---|
| 1 | 1 | 1 | 1 | 1 | 1 | 0 | 0 | T 0~7 |
| 1 | 0 | 1 | 0 | 0 | 0 | 0 | 0 | NEXT D 0~7 |
| 1 | 1 | 1 | 0 | 0 | 0 | 0 | 0 | NEXT T 0~7 |

FIG. 4

BIT POSITION ENCODER IMPROVED IN OPERATING SPEED

BACKGROUND OF THE INVENTION

1. Field of the Invention

The invention relates to a bit position encoder, intended for use in equipment such as facsimile equipment, for searching a bit string for a bit having a predetermined value.

2. Description of the Related Art

A bit position encoder is a device which searches a bit string of 8 bits from right to left or from left to right for, for example, high bits (1s) and encodes the first high-bit position into 3-bit data. In a conventional bit position encoder, the output of a search circuit which has searched for a high bit first is transferred to the adjacent search circuit. Thus, the output of the adjacent search section is not determined during the data propagation. The operating speed of the bit search circuit depends therefore on the time required to propagate data.

In the case of a bit position encoder for an 8-bit string, it is when input data D7 to D0=00000001 is searched from LSB (right) to MSB (left) that it takes a maximum amount of time for output data to be determined. In order to transfer data of a 1, a delay time corresponding to 16 gates will be required. The delay time becomes longer as data to be searched increases in bit length to 16 bits, 32 bits. Therefore, a problem arises in that difficulties are involved in speeding up the bit search.

SUMMARY OF THE INVENTION

It is an object of the present invention to provide a bit position encoder which permits a time required to search for high bits to be shortened even if input data to be searched has many bits.

According to the present invention there is provided a bit position encoder comprising: a plurality of judging means, corresponding in number to bits of input data, the judging means being connected to receive respective bits of the input data in parallel and a signal specifying the judgment processing sequence, for Judging a judgment on the basis of the result of a judgment from an adjacent judging means that has made a judgment of whether a corresponding input bit input thereto has a predetermined value and supplying the result of the judgment to an adjacent judging means that has not performed judgment processing yet; means, responsive to the results of Judgments from the plurality of judging means, for pointing out the bit position in the predetermined value appears first in the direction of judgment processing sequence in a binary code; and means, connected to receive the input bits, for supplying a result of the logical OR of the input bits to the judging means.

The present invention leads to the following advantages.

In the case where the present invention is not carried out, when a predetermined value (for example, a 1) is present in any one of the parallel judging means (for example, A2 that receives D2), in order for the fact that the predetermined value is present in the preceding judging means to be communicated to the succeeding judging means (for example, A3 to A7) located in the processing sequence direction from the preceding judging means, it is necessary to follow the procedure of communicating the fact to the next judging means after a judging process has been performed in the preceding judging means. The communication takes a very long time. According to the present invention, however, when the predetermined value is present in any one of the judging means, for example, A2 that receives D2, the presence of the D2 having the predetermined value is directly communicated to the succeeding judging means. Thereby, the presence of the predetermined value can be communicated fast without waiting completion of the processing by each Judging means, and succeeding judging means can perform their judging processes early. Thus, the entire processing by the Judging means can be speeded up and the processing by the pointing means also terminates quickly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a table for use in explanation of the operation of the bit position encoder of FIG. 1;

FIG. 4 is a table for use in explanation of the bit position encoder of FIG. 5.

DETAILED DESCRIPTION OF THE PREFERRED EMBODIMENTS

Figure 1:
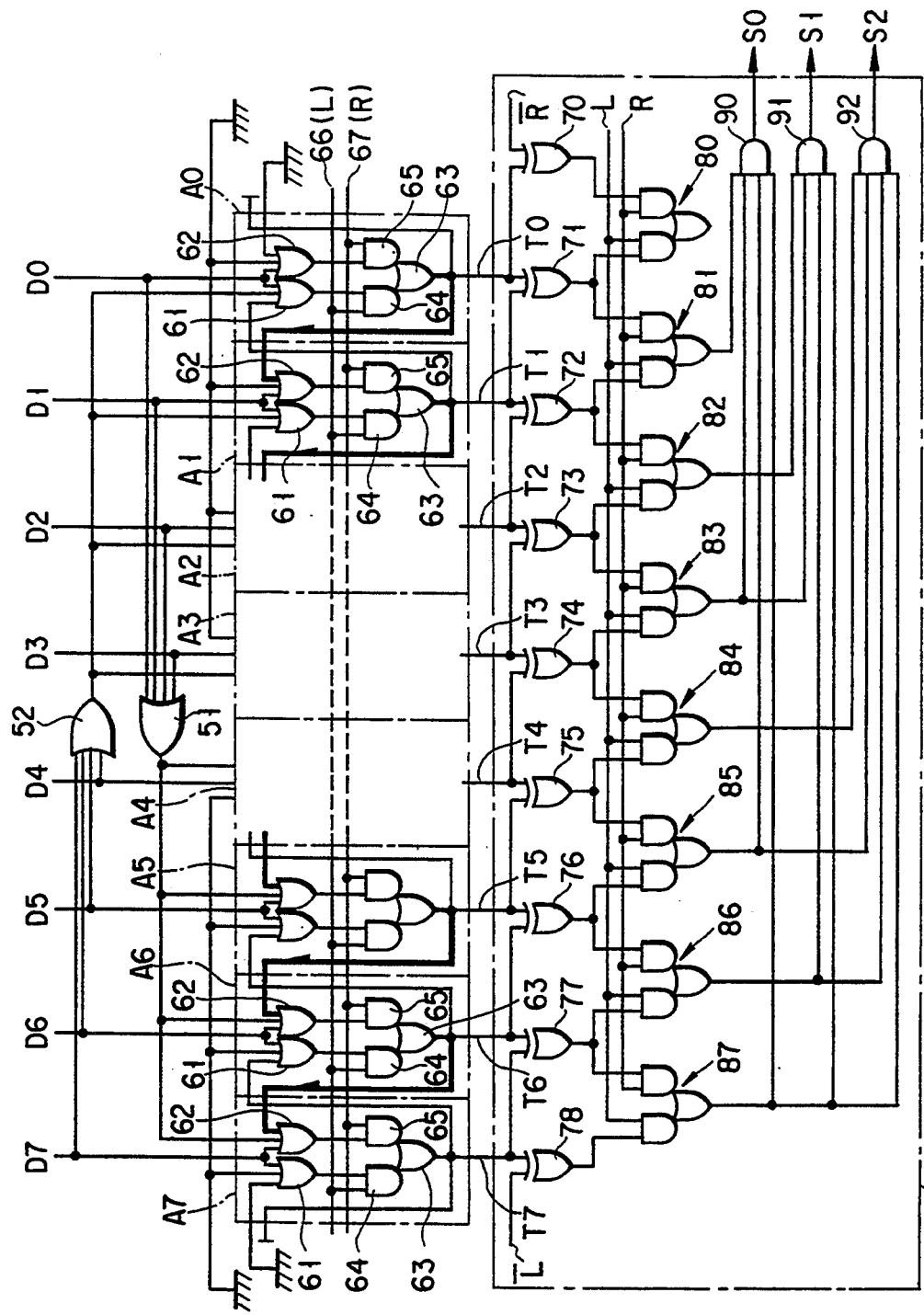
FIG. 1 is a circuit diagram of a bit position encoder to according to a first embodiment of the present invention.

Referring now to FIG. 1, there is shown a bit position encoder of the present invention, which is adapted to search a bit string of eight bits from right (the least significant bit; LSB) to left (the most significant bit; MSB) for, for example, high bits (1s) contained in the string and encode the position of the first high bit into 3-bit data.

That is, eight input bits D7, D6, D5, D4, D3, D2, D1 and D0 are applied to search circuits A7, A6, A5, A4, A3, A2, A1 and A0, respectively. Each of the search circuits is composed of OR gates 61, 62, 63 and AND gates 64, 65. These search circuits A7 through A0 have substantially the same arrangement, and thus description will be made of only the search circuits A7 and A6.

In the search circuits A7 and A6, each of the bits D7 and D6 is applied to the OR gates 61 and 62. The outputs of the OR gates 61 and 62 are connected to first input terminals of the AND gates 64 and 65, respectively. The second input terminal of the AND gate 64 is connected to a first signal line 66 for supplying a signal L indicating a search direction, while the second input terminal of the AND gate 65 is connected to a second signal line 67 for supplying a signal R indicating a search direction. The output terminals of the AND gates 64 and 65 are connected to input terminals of the OR gate 63.

Another input terminal of the OR circuit 61 in the search circuit A7 is connected to ground potential, while another input terminal of the OR gate 62 is connected to the output terminal of the OR circuit 62 in the search circuit A6. The output terminal of the OR gate 63 in the search circuit A7 is connected to another input terminal of the OR g ate 61 in the search circuit A6.

The output terminal of the OR gate 63 in each of the search circuits A7 through A0 is connected to an encoder circuit EC. The encoder circuit EC is constructed from exclusive OR gates 70 through 78, AND-to-OR gate networks 80 through 87 each comprising two AND gates and one OR gate, and AND gates 90, 91 and 92 to which the output terminals of the AND-to-OR gate networks 80 through 87 are connected properly.

Suppose here that the eight bits of D7 to D0=00100100 are applied to the search circuits A7 to A0, and this bit string is searched from right (LSB) to left (MSB) to find 1s therein. Then, the signal R is made a 1, while the signal L is made a 0. Under this condition, the outputs T7 to T0 of the search circuits A7 to A0 will be T7T6 . . . T1T0=11111100.

That is, in this case, 0s are output from the search circuits A0 and A1, and a 1 is output from the search circuit A2 according to the input data. The output of a 1 is propagated from A2 through A3, A4, A5 and A6 to A7, so that the outputs T7 to T0 of the search circuits A3 to A7 are made all 1s. The outputs T7 to T0 are encoded by the encoder circuit EC with the result that outputs S2, S1 and S0 of the encoder circuit become S2S1S0=011.

When that bit string is searched from left to right, on the other hand, the signal R is made a 0, while the signal L is made a 1. As a result, the outputs T7 to T0 of the search circuits A7 to A0 will be T7T6 . . . T1T0=00111111.

That is, in this case, a 0 is output from each of the search circuits A7 and A6, and a 1 is output from the search circuit A5 according to the input data. The output of a 1 is transferred from A5 through A4, A3, A2 and A1 to A0, so that the outputs T7 to T0 of the search circuits A3 to A7 are made all 1s. The outputs T7 to T0 are encoded by the encoder circuit EC with the result that its outputs S2, S1 and S0 become S2S1S0=101.

FIG. 2 is a table for use in explanation of the operation of the bit position encoder of FIG. 1. The table illustrates the above operating states.

As a feature of the present invention, of the input bits D7 to D0, the low-order four bits D3, D2, D1 and D0 are applied to an OR gate 51, and the high-order four bits D7, D6, D5 and D4 are applied to an OR gate 52. An output signal of the OR gate 51 is applied to the search circuits A7 to A4, while an output signal of the OR gate 52 is applied to the search circuits A3 to A0.

According to the above feature, the application of the output of the OR gate 51 supplied with the low-order four bits of a string of eight bits to the search circuits A7 to A4 for searching the high-order four bits and the output of the OR gate 52 supplied with the high-order four bits to the search circuits A3 to A0 for searching the low-order four bits permits the outputs of the search circuits A7 to A4 or A3 to A0 to be concurrently determined when a 1 is present in the input bits applied to the OR gate 51 or 52. Therefore, the number of the search circuits for propagating data of a 1, i.e., the number of gates can be decreased, allowing high-speed operation.

A plurality of arrows A, B, C, and D drawn on the rows for T0 to T7 shown in FIG. 2 represent propagation of data of a 1. In the case of search in the L direction, the propagation A using the route indicated by bold lines in FIG. 1 and fast, concurrent propagation B due to the presence of the OR gate 51 are made. In the case of search in the R direction, on the other hand, propagation C and fast, concurrent propagation D due to the presence of the OR gate 52 are made. It is obvious that the propagation B and D using the OR gates 51 and 52 are faster than the propagation A and C because of concurrent processing by the OR gates.

Figure 3:
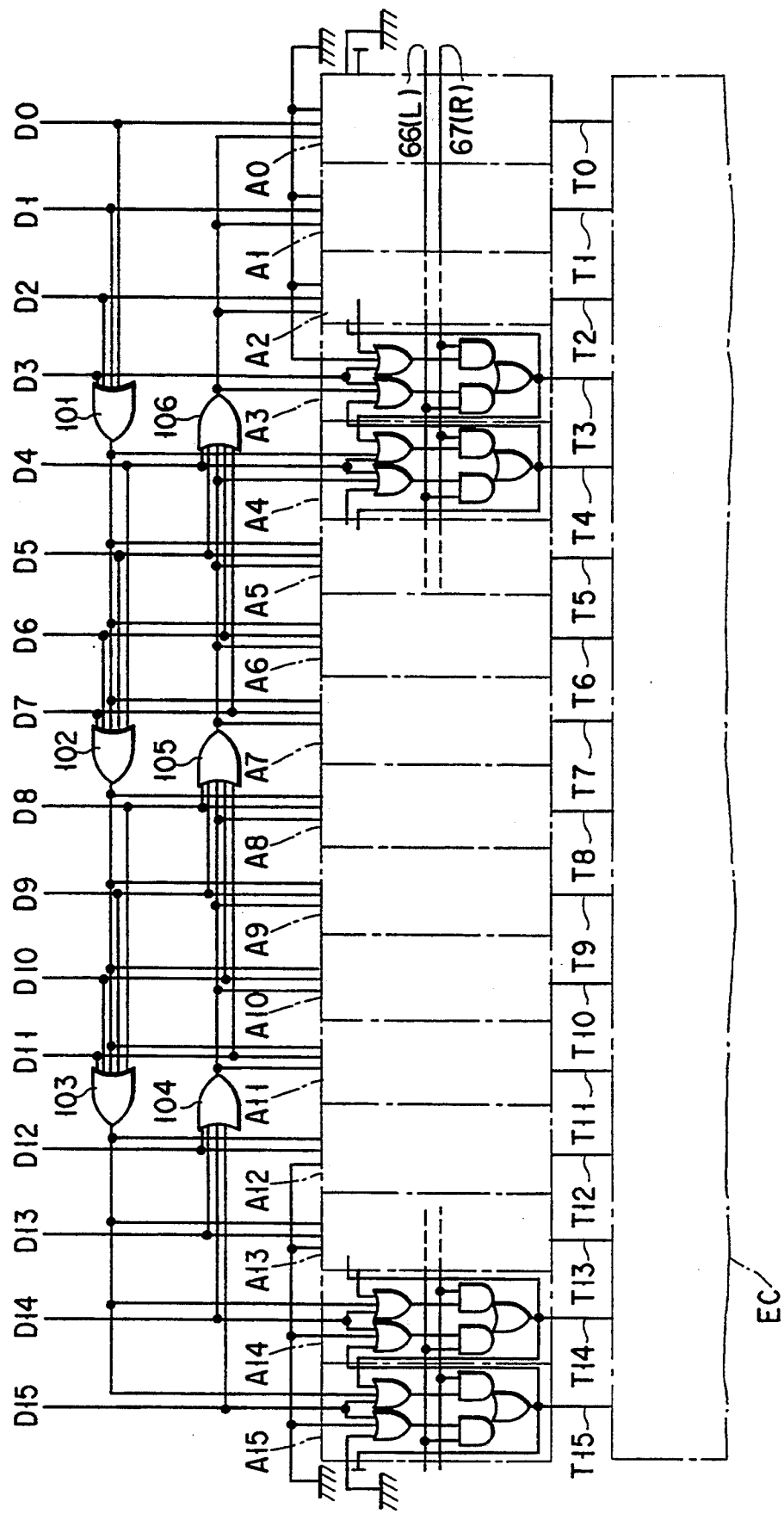
FIG. 3 is a circuit diagram of a bit position encoder according to a second embodiment of the present invention.

FIG. 3 illustrates a second embodiment of the present invention.

In the second embodiment, input data is 16 bits in length. Of 16 input bits, bits D0 to D3 are applied to search circuits A0 to A3 and an OR gate 101. The output of the OR gate 101 is applied to search circuits A4 to A7 together with input bits D4 to D7 and to an OR gate 102 together with the input bits D4 to D7. The output of the OR gate 102 is applied to search circuits A8 to A11 together with input bits D8 to D11 and to an OR gate 103 together with the input bits D8 to D11. The output of the OR gate 103 is applied to search circuits A12 to A15 together with input bits D12 to D15.

The input bits D12 to D15 are applied to an OR gate 104. The output of the OR gate 104 is applied to the search circuits A8 to A11 and to an OR gate 105 together with the input bits D8 to D11. The output of the OR gate 105 is applied to the search circuits A7 to A4 and to an OR gate 106 together with the input bits D7 to D4. The output of the OR gate 106 is applied to the search circuits A0 to A3.

The search circuits A15 to A0 are the same in arrangement as those in the first embodiment. Outputs of the search circuits A15 to A0 are applied to an encoder circuit EC. The arrangement of the encoder circuit EC is omitted because it is not the heart of the present invention.

In the arrangement of FIG. 3, the output of the OR gate 101 is applied to the search circuits A4 to A7 and the OR gate 102. The output of the OR gate 102 is applied to the search circuits A8 to A11 and the OR gate 103. The output of the OR gate 103 is applied to the search circuits A12 to A15. The output of the OR gate 105 is applied to the search circuits A7 to A4 and the OR gate 106. The output of the OR gate 106 is applied to the search circuits A3 to A0. In the case where the 16-bit input data, D15 to D0, is searched from MSB to LSB or from LSB to MSB, if a high bit is contained in data applied to a certain OR gate, outputs of search circuits supplied with the output of that OR gate can be determined simultaneously. It is therefore required only that the transfer of the high bit be made from a search circuit supplied with that high bit to the leftmost or rightmost search circuit of search circuits supplied with the same input bits as that OR gate which is supplied with the high bit. Thus, even if input data is great in bit length as in this embodiment, the propagation delay is the same as in the embodiment previously described, permitting high-speed operation.

In the present invention, the larger the number of bits in input data, the more the advantage becomes. That is, if input data is 8 bits in length, propagation delay corresponding to as many as 16 gates will occur in the absence of the OR gates of the present invention. In the first embodiment shown in FIG. 1, however, the propagation delay corresponds to as many as 8 gates. If, on the other hand, input data is 16 bits in length and the arrangement of the present invention is not used, theoretically the propagation delay corresponding to 32 gates will occur. In the embodiment shown in FIG. 3, however, the propagation delay corresponds to only 10 gates. If input data is 16 bits long and the OR gates of the present invention are not provided, the time that elapses from the application of the input data before output data is obtained from the encoder is 19.5 nsec. In the embodiment shown in FIG. 3, however, the encoder outputs are obtained in 8.5 nsec. Shortening of this time is due to the arrangement of the present invention that increases the propagation speed of data of a 1.

Further, if input data is 32 bits long and the arrangement of the present invention is not used, theoretically the propagation delay that will occur corresponds to 64 gates. In the present invention, however, the propagation delay corresponds to only 14 gates.

Figure 5:
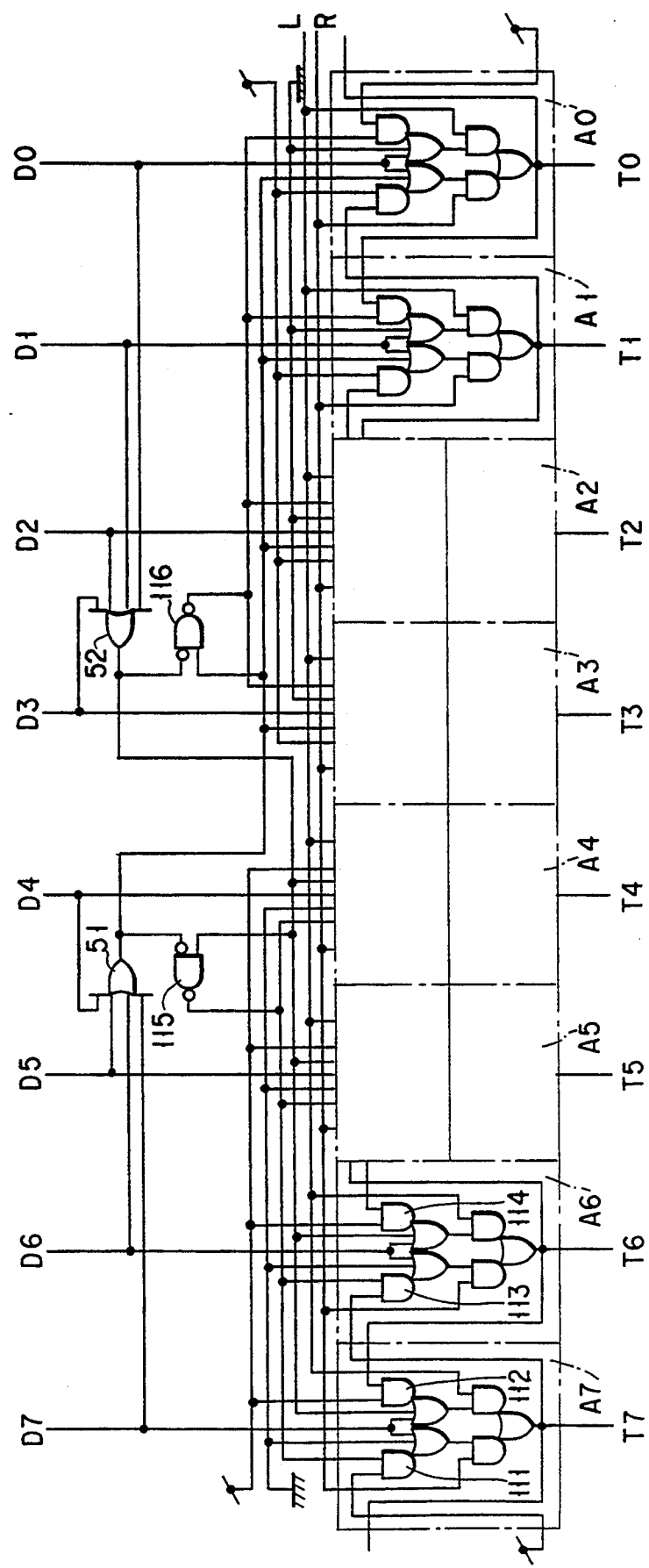
FIG. 5 is a circuit diagram of a bit position encoder according to a third embodiment of the present invention.

FIG. 5 is a table for use in explanation of the operation of the bit position encoder, and FIG. 6 is a circuit diagram of a third embodiment of the present invention.

FIG. 5 illustrates states of the outputs T0 to T7 of the search circuits A0 to A7 when input data D0 to D7 and next input data D0 to D7 are applied successively. According to this table, for example, the outputs T2, T3 and T4 are changed from 1s to 0s when the next input data is applied. Some time will be taken to cause these output changes because the search circuits, each having a number of logic circuits, perform processing in sequence in a search direction. In the embodiment of FIG. 6, when the position of the first high bit in a search direction is determined, a signal indicating a 0 is directly transferred so as to make the outputs of search circuits before that high-bit position all 0s.

That is, AND gates 121 to 124 are added to the search circuits A0 to A7. There are further provided NAND gates 115 and 116 each of which NANDs the outputs of the OR gates 115 and 116. The output of the NAND gate 115 is connected to an input of the AND gate 111 (in the search circuit A7 shown in FIG. 5) and to an input of the AND gate 113 (in the search circuit A6). Thereby, the search circuits A0 to A7 come to have the following function. That is, OR gates which are not used to bypass a signal of a 1 in a predetermined search direction are used to bypass a signal of a 0, thereby quickly determining outputs of search circuits that are to be made 0s.

Further, as the function of this circuit, in principle a comparison is made between input bits D0 to D7 and a signal transferred from a search circuit of one circuit before in a search direction to determine outputs T0 to T7. However, when what is called a bypass signal (a 0 or a 1) is established, the outputs T0 to T7 are determined according to that signal. If bypass signals of a 0 and a 1 are established simultaneously, then a 1 is output. Thereby, a bit position encoder can be realized that permits high-speed processing in both a signal of a 1 and a signal of a 0.

Although the preferred embodiments of the present invention have been disclosed and described, it is apparent that other embodiments and modifications are possible.

According to the present invention, as described above, there is provided a bit position encoder which permits a search time to be shortened even in the case where input data has many bits.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A bit position encoder comprising:
    transmitting means for transmitting bits of input data;
    input means coupled to said transmission means for receiving said bits of input data, said input means including OR'ing means for generating a first output signal which is a logical OR of the input bits;
    a plurality of judging means, corresponding in number to the bits of input data, each of said plurality of judging means being connected to said input means to receive respective bits of the input data in parallel and a signal specifying the sequence in which the respective bits of the input data are to be judged, for performing a judgment on the basis of the result of a judgment from an adjacent judging means that has made a judgment of whether a corresponding input bit input thereto has a predetermined value, each of said plurality of judging means including supplying means for supplying a second output signal corresponding to the result of the judgment to an adjacent judging means that has not performed judgment processing yet;
    means, responsive to the the second output signal from the plurality of judging means, for designating the bit position in the predetermined value that appears first in a direction of judgment processing sequence in a binary code.

2. A bit position encoder according to claim 1, further comprising:
    first means, responsive to said signal specifying the sequence in which the respective bits of the input data are to be judged, for causing the judging means to start processing from one of the judging means on the specified side; and
    second means, connected to receive others of the input bits than those supplied to the means, for supplying the result of a logical OR of these input bits to other judging means than those supplied with the output of the first means.

3. A bit position encoder according to claim 1, wherein the judging means are eight in number, and the designating means designates the bit position by a 3-bit signal.

4. A bit position encoder according to claim 1, wherein the judging means are eight in number, and the designating means designates the bit position by a 3-bit signal.

5. A bit position encoder comprising:
    transmission means for transmitting 8-bit input data;
    first means, coupled to said transmission means to receive the rightmost (low-order) four bits of the 8-bit input data, for performing a logical OR function on the rightmost four bits, said first means including first supplying means for supplying a first signal corresponding to a result of said logical OR function of the rightmost four bits;
    second means, coupled to said transmission means to receive the leftmost (high-order) four bits of the 8-bit input data, for performing a logical OR function the leftmost four bits, said second means including second supplying means for supplying a second signal;

eight judging means, connected to receiving respective bits of the 8-bit input data in parallel, a signal representing judgment result from an adjacent judging means and a signal to specify judgment processing sequence, the leftmost four of said eight judging means receiving said first signal, the rightmost four of said eight judging means receiving said second signal, each of said eight judging means for performing a judgment of whether corresponding input bits have a predetermined value and outputting a third signal corresponding to said judgment result to an adjacent judging means which has not made a judgment yet; and means, connected to receive the third signal from each of the eight judging means, or designating a bit position in which the predetermined value appears first in the direction of judgment processing sequence in a binary code.

6. A bit position encoder according to claim 5, further comprising:

a first NAND gate connected to receive the complement of the output of the first supplying means and the output of the second supplying means for supplying its output to the rightmost four judging means of the eight judging means; and a second NAND gate connected to receive the output of the first supplying means and the complement of the output of the second supplying means for supplying its output to the leftmost four judging means of the eight judging means; and wherein the judging means output 0s when they receive outputs of the first and second NAND gates, 1s when they receive outputs of the first and second supplying means, and 1s when they receive outputs of both the NAND gates and the supplying means.

7. A bit position encoder comprising:

transmission means for transmitting 16-bit input data;

first means, coupled to said transmission means to receive rightmost (low-order) first, second, third and fourth bits of the 16-bit input data, for generating a first signal corresponding to a logical OR of the rightmost first, second, third and fourth bits of the 16-bit input data;

second means, coupled to said transmission means and said first means to receive the first signal and fifth, sixth, seventh and eighth bits of the 16-bit input data, for generating a second signal corresponding to a logical OR of the first signal, and the fifth, sixth, seventh and eighth bits of the 16-bit input data;

third means, coupled to said transmission means and said second means to receive the second signal and ninths, tenth, eleventh and twelfth bits of the 16-bit input data for generating a third signal corresponding to a logical OR of the second signal and the ninth, tenth, eleventh and twelfth bits of the 16-bit input data;

fourth means, coupled to said transmission means to receive thirteenth, fourteenth, fifteenth and sixteenth bits of the 16-bit input data, for generating a fourth signal corresponding to the logical OR of the thirteenth, fourteenth, fifteenth and sixteenth bits of the 16-bit input data;

fifth means, coupled to said transmission means and said fourth means to receive the fourth signal and the ninth, tenth, eleventh and twelfth bits of the 16-bit input data, for generating a fifth signal corresponding to a logical OR of the fourth signal and the ninth, tenth, eleventh and twelfth bits of the 16-bit input data;

sixth means, coupled to said transmission means and said fifth means to receive the fifth signal and the first, second, third and fourth bits of the 16-bit input data, for generating a sixth signal corresponding to a logical OR of the fifth signal and the first, second, third and fourth bits of the 16-bit input data;

sixteen judging means each of which being connected to receive respective bits of the 16-bit input data in parallel, a signal representing a judgment result from an adjacent one of the judging means and a signal for specifying a direction of judgment processing, a first, second, third and fourth judging means of the sixteen judging means receiving said first and sixth signals, a ninth, tenth, eleventh and twelfth judging means of the sixteen judging means receiving said second third and fourth signals, and a fifth, sixth, seventh, and eighth judging means of the sixteen judging means receiving said fifth signal, each of said judging means for performing a judgment of whether corresponding input bits have a predetermined value and supplying a seventh signal corresponding to a judgment result to an adjacent judging means which has not made a judgment yet;

means, connected each of said judging means to receive the seventh signal, for designating the bit position in which the predetermine value appears first in the direction of judgment processing in a binary code.

* * * * *

UNITED STATES PATENT AND TRADEMARK OFFICE
CERTIFICATE OF CORRECTION

PATENT NO. : 5,381,491
DATED : January 10, 1995
INVENTOR(S) : Kazumasha ANDO et al.

It is certified that error appears in the above-indentified patent and that said Letters Patent is hereby corrected as shown below:

Claim 1, Column 6, Line 33 delete "the"

(second occurrence).

Claim 7, Column 8, Line 5 change "ninths" to --ninth--.

Signed and Sealed this

Twenty-fifth Day of July, 1995

*Attest:*

BRUCE LEHMAN

*Attesting Officer*   *Commissioner of Patents and Trademarks*